US008851367B2

(12) United States Patent
Nakamoto et al.

(10) Patent No.: US 8,851,367 B2
(45) Date of Patent: Oct. 7, 2014

(54) MONEY PROCESSING DEVICE

(75) Inventors: Tasuku Nakamoto, Hyogo (JP); Takahisa Uno, Hyogo (JP); Yoshikatsu Mizushima, Hyogo (JP)

(73) Assignee: Glory Ltd., Himeji-Shi, Hyogo (JP)

( * ) Notice: Subject to any disclaimer, the term of this patent is extended or adjusted under 35 U.S.C. 154(b) by 205 days.

(21) Appl. No.: 13/395,136

(22) PCT Filed: Sep. 11, 2009

(86) PCT No.: PCT/JP2009/065900
§ 371 (c)(1),
(2), (4) Date: Mar. 9, 2012

(87) PCT Pub. No.: WO2011/030438
PCT Pub. Date: Mar. 17, 2011

(65) Prior Publication Data

US 2012/0173013 A1 Jul. 5, 2012

(51) Int. Cl.
*G06Q 40/00* (2012.01)
*G07D 11/00* (2006.01)
*G07F 19/00* (2006.01)

(52) U.S. Cl.
CPC ........... *G07D 11/0084* (2013.01); *Y10S 902/12* (2013.01); *Y10S 902/13* (2013.01)
USPC ............. 235/379; 194/206; 209/534; 902/12; 902/13

(58) Field of Classification Search
USPC ............... 235/379; 705/39, 43; 194/205, 206, 194/302, 350; 209/534; 902/8, 9, 11–15
See application file for complete search history.

(56) References Cited

U.S. PATENT DOCUMENTS

| | | | | |
|---|---|---|---|---|
| 7,819,308 | B2 * | 10/2010 | Osterberg et al. | 235/379 |
| 8,387,863 | B2 * | 3/2013 | Mizushima | 235/379 |
| 2004/0134839 | A1 | 7/2004 | Kobayashi et al. | |
| 2005/0056519 | A1 * | 3/2005 | Yokoi et al. | 194/206 |
| 2005/0189266 | A1 | 9/2005 | Fujita et al. | |
| 2010/0185317 | A1 * | 7/2010 | Aso et al. | 700/214 |
| 2012/0305362 | A1 * | 12/2012 | Iwamura et al. | 194/206 |

FOREIGN PATENT DOCUMENTS

| | | | |
|---|---|---|---|
| DE | 102 39 563 | A1 | 3/2004 |
| EP | 2 071 528 | A1 | 6/2009 |
| JP | 2002-312821 | | 10/2002 |

OTHER PUBLICATIONS

European Search Report (Application No. 09849217.6—PCT/JP2009/065900) (5 pages—dated Oct. 18, 2013).

* cited by examiner

*Primary Examiner* — Michael G Lee
*Assistant Examiner* — Suezu Ellis
(74) *Attorney, Agent, or Firm* — Renner, Kenner, Greive, Bobak, Taylor & Weber

(57) ABSTRACT

A money processing device is provided with a mode setting unit for setting a processing mode relating to a form of a process to be executed so that the mode can be switched between a mode for performing temporal retention and a mode for not performing the temporal retention, in response to a user's command, and is constituted so that, at the time of a process for depositing money or a process for withdrawing money, if the processing mode is set to the escrow mode, the deposit money or the withdrawal money is temporarily suspended, whereas if the processing mode is set to the non-escrow mode, the deposit money or the withdrawal money cannot be temporarily retained. Thereby, at the time of the process for depositing money or the process for withdrawing money, whether or not the operation for temporarily retaining money is performed can be changed by a user.

7 Claims, 9 Drawing Sheets

MONEY PROCESSING DEVICE

TECHNICAL FIELD

The present invention relates to a money processing device that executes a process relating to money such as a deposit process or a dispensing process.

BACKGROUND ART

Money processing devices that execute a process relating to money such as a deposit process and a dispensing process in a bank or the like are known in the art. Depositing or dispensing of money can be performed correctly and promptly by using the money processing device as compared to manual operation.

The deposit process performed by the money processing device is, for example, executed in the manner explained below. First, the money received in an inlet is transported to an escrow unit and temporarily escrowed therein. During the transportation, recognition of denomination, authentication, fitness and the like is executed for each of the deposited money. Based on a recognition result, a deposited amount, which is the total amount of the deposited money, is calculated.

Subsequently, the money processing device displays the deposited amount on a display unit or the like as well as causes the user to select whether or not to approve the deposit process. When the user selects to approve the deposit process, the deposited money in the escrow unit is transported to and stored in a storage unit. In contrast, when the user selects to not approve the deposit process, the deposited money in the escrow unit is returned to the user.

That is, the deposited money received in the inlet is not immediately stored in the storage unit but first temporarily stored in the escrow unit, and if the deposit process is cancelled, the deposited money is returned as it is to the user from the escrow unit.

In this manner, by performing an approval operation for the deposited money, if the deposited amount is not approved, the actually deposited money is returned to the user. Thus, occurrence of a doubtful transaction can be prevented and the money can be processed correctly.

In a money processing device that does not include the escrow unit so that the deposited money is immediately stored in a storage unit, if the deposit process is cancelled, it is necessary to feed out the money notes one by one from the storage unit and return to the user. As compared to such a device, the money processing device that employs the escrow unit is advantageous in that the process for returning the money can be performed promptly.

Not only when performing the deposit process but also when performing the dispensing process, dispensing money can be escrowed without immediately transporting it to an outlet. In such a money processing device, for example, if a fault occurs while the dispensing money is being escrowed, a cancellation process can be realized without taking into consideration money that has been dispensed from the outlet.

CONVENTIONAL ART DOCUMENTS

Patent Documents

[Patent Document 1] Japanese Patent Application Laid-open No. 2004-145600

DISCLOSURE OF INVENTION

Problem to be Solved by the Invention

As explained above, use of the escrow unit is very effective to correctly perform the money processing. However, longer time is required to transport the money from the inlet to the storage unit via the escrow unit as compared to a case where the money is directly transported to the storage unit. Particularly, this becomes a serious issue when a large amount of money is deposited.

Depending on the objective of use and the use environment of the money processing device, in some cases promptness is more important than correctness. For example, the importance of the approval process is low in situations such as where the total amount being handled is already known, or where a small amount of money is being deposited. Some of the users may even demand that the process be completed promptly even if that requires omission of the escrow process.

In this regard, there is a need of a money processing device that can flexibly respond to the objective of use and the use environment by performing the money processing without the escrow process in some cases, while in other cases making it possible to correctly perform the money processing by using the escrow unit.

The present invention has been made in view of the above discussion and it is an object of the present invention to provide a money processing device in which it can be set whether to perform the escrow process for the money in the deposit process and the dispensing processes. Furthermore, it is another object of the present invention to provide a money processing device that uses the escrow unit effectively even when the escrow process is not to be performed.

Means for Solving the Problem

To solve the above problems, according to a first aspect of the present invention, a money processing device that processes money includes an inlet for receiving money for the deposit process; a plurality of storage units that store therein money; an escrow unit that escrows money; a transport unit that transports the deposited money from the inlet to the storage units via the escrow unit; a mode setting unit that sets an operation mode to be performed in a deposit process to any of an escrow mode and a non-escrow mode; and a control unit that controls the transport unit, based on settings made by the mode setting unit. In the escrow mode, the control unit exerts control so as to transport the deposited money received in the inlet to the escrow unit and temporarily escrow therein, and then transport the deposited money to the storage units and store therein. In the non-escrow mode, the control unit exerts control so as to directly transport the deposited money from the inlet to the storage units and store therein without escrowing in the escrow unit.

According to a second aspect of the present invention, a money processing device that processes money includes a plurality of storage units that store therein money; an outlet for dispensing money for a dispensing process; an escrow unit that temporarily escrows money; a transport unit that transports dispensing money from the storage unit to the outlet via the escrow unit; a mode setting unit that sets an operation mode to be performed in a dispensing process to any of an escrow mode and a non-escrow mode; and a control unit that controls the transport unit, based on settings made by the mode setting unit. In the escrow mode, the control unit exerts control so as to transport the dispensing money from the storage units to the escrow unit, and then transport the dispensing money to the outlet and dispense therefrom. In the non-escrow mode, the control unit exerts control to directly transport the dispensing money from the storage units to the outlet and dispense therefrom without escrowing in the escrow unit.

According to a third another aspect of the present invention, the money processing device according to the first aspect further includes a recognition unit that recognizes fitness of the deposited money. In the non-escrow mode, the control unit transports the deposited money that is recognized to be unfit to the escrow unit and stores therein.

According to a fourth aspect of the present invention, the money processing device according to the third aspect further includes a reject box that stores therein rejected banknotes. The control unit transports the deposited money that is recognized to be unfit to the reject box or the escrow unit and stores therein.

According to a fifth aspect of the present invention, in the money processing device according to the fourth aspect, the control unit, when unfit banknotes are stored in the escrow unit and there is a free space in the reject box, transports the unfit banknotes from the escrow unit to the reject box and stores therein.

According to a sixth aspect of the present invention, in the money processing device according to the fourth aspect, the control unit, when unfit banknotes are stored in the escrow unit and there is no free space in the reject box, inform a user of a fact that the unfit banknotes are being stored in the escrow unit.

According to a seventh aspect of the present invention, the money processing device according to the first aspect further includes a recognition unit that recognizes whether the deposited money is a target money for the deposit process. In the non-escrow mode, the control unit transports the deposited money that is recognized to be non-target money for the deposit process to the escrow unit and stores therein.

According to an eighth aspect of the present invention, in the money processing device according to the seventh aspect, the control unit calculates a money value of the non-target money by converting it into a money value of the target money for the deposit process.

According to a ninth aspect of the present invention, in the money processing device according to the first aspect, further comprising an outlet for dispensing money, and wherein the escrow unit stores, in the non-escrow mode, traceable money having serial numbers previously recorded, and the control unit, in the non-escrow mode, transports the traceable money from the escrow unit to the outlet and dispenses therefrom based on a specific instruction.

According to a tenth aspect of the present invention, the money processing device according to the ninth aspect further includes a recognition unit that identifies a serial number of the money. The control unit causes the recognition unit to identify the serial numbers of the money received in the inlet or the money transported from the storage unit, outputs the identified serial numbers, and transports the money having the identified serial numbers to the escrow unit and stores therein as the traceable money.

According to an eleventh aspect of the present invention, the money processing device according to the tenth aspect further includes a memory unit that stores therein the serial numbers, identified by the recognition unit and output by the control unit, of the traceable money.

According to a twelfth aspect of the present invention, the money processing device according to the first aspect further includes an outlet for dispensing money for the dispensing process. The escrow unit stores therein, in the non-escrow mode, money of a specific denomination. In the non-escrow mode, based on an instruction for money exchange from the deposited money to the specific denomination, the control unit transports the money of the specific denomination that is equivalent to the deposited money from the escrow unit prior to the storage unit, and when there is a shortage of money in the escrow unit, transports money of the specific denomination from the storage unit and dispenses the money from the outlet.

According to a thirteenth aspect of the present invention, the money processing device according to the first aspect further includes an outlet for dispensing money for the dispensing process. The escrow unit stores therein, in the non-escrow mode, money of a specific denomination. In the non-escrow mode, based on an instruction for money exchange from the deposited money to the specific denomination, the control unit transports the money of the specific denomination that is equivalent to the deposited money from the storage unit prior to the escrow unit, and when there is a shortage of money in the storage unit, transports money of the specific denomination from the escrow unit and dispenses the money from the outlet. When the money of the specific denomination is stored in the escrow unit and there is a free space in the storage unit that stores the money of the specific denomination, the control unit transports the money from the escrow unit to the storage unit and stores therein.

ADVANTAGES OF THE INVENTION

According to the money processing devices of the first aspect and the second aspect of the present invention, money is escrowed in the deposit process and the dispensing process when the user sets the escrow mode, and money is not escrowed in the deposit process and the dispensing process when the user sets the non-escrow mode. Thus, user can decide whether escrowing of the money is to be performed. As a result, it is possible to flexibly respond to the use environment.

According to the third aspect, when the non-escrow mode is set, fit banknotes and unfit banknotes can be stacked in separate places, and the escrow unit can be used to stack the unfit banknotes.

According to the fourth aspect, the escrow unit can be used to stack the unfit banknotes so that the process can be continued without stopping even in situations where there is a shortage of free space in the reject box.

According to the fifth aspect, by storing the banknotes in the reject box prior to the escrow unit, degradation of security level arising due to use of the escrow unit for storing the banknotes can be prevented.

According to the sixth aspect, by informing the user of that the banknotes are remaining in the escrow unit, degradation of security level arising due to use of the escrow unit for storing the banknotes can be prevented.

According to the seventh aspect, the non-target banknotes that are not recycled can be separately stored from the target banknotes for the process.

According to the eighth aspect, even the non-target banknotes that are not recycled are accepted for the deposit process, and, after converting a money value of the non-target banknotes into a money value of the target banknotes, it is added to the deposited amount.

According to the ninth aspect, by storing the traceable banknotes having previously recorded serial numbers in the escrow unit, the banknotes can be dispensed in case of emergency such as a robbery and can be traced after the robbery has taken place.

According to the tenth aspect, the traceable banknotes can be prepared inside the money processing device and stored in the escrow unit.

According to the eleventh aspect, when the traceable banknotes are prepared inside the money processing device, the serial numbers of the traceable banknotes can be stored in the money processing device.

According to the twelfth aspect, the escrow unit can be used to store the banknotes for the money exchange, and when performing the money exchange process, the banknotes in the escrow unit can be dispensed.

According to the thirteenth aspect, the escrow unit is used to replenish money to the storage unit, and when banknotes stored in the storage unit are dispensed, banknotes can be supplied from the escrow unit to the storage unit.

EMBODIMENTS OF THE INVENTION

Exemplary embodiments of the present invention are explained below in details with reference to the accompanying drawings. Meanwhile, the embodiments disclosed below are examples, and the present invention, its application, and use are not limited to these embodiments. Moreover, there can be several modifications that are not explained here, but that do not fall outside the scope of the present invention.

Embodiments of the present invention are explained below with a banknote processing system 1 as an example.

Figure 1:
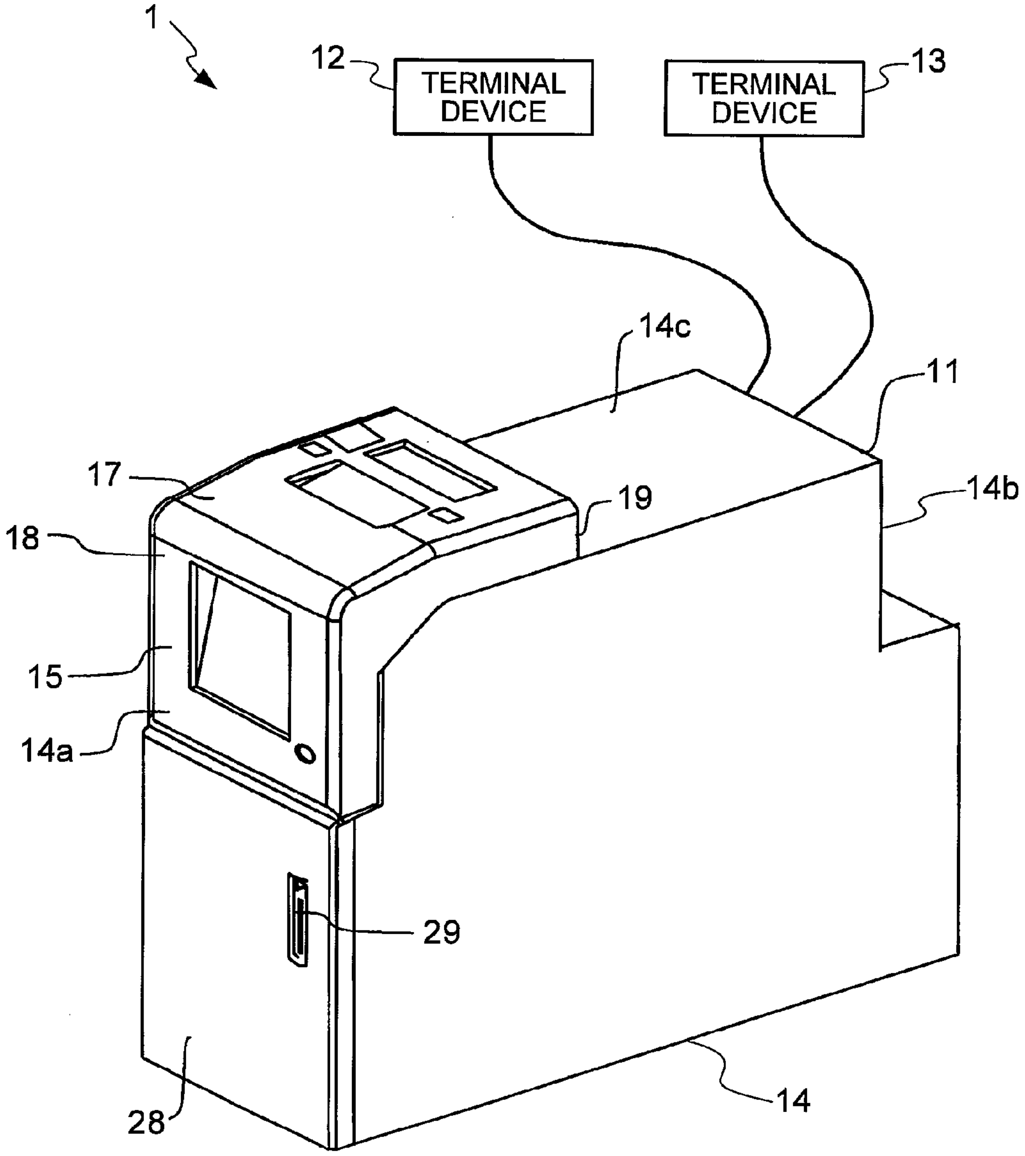
FIG. 1 is a structural diagram of a banknote handling system according to an embodiment of the present invention.

A structure of the banknote processing system 1 is shown in FIG. 1. The banknote processing system 1 includes a banknote depositing and dispensing apparatus 11 and two terminal devices (12 and 13). The banknote depositing and dispensing apparatus 11 corresponds to the money processing device according to the present invention.

The terminal devices (12 and 13) are, for example, operation terminals such as personal computers, and they allow a user, such as a teller, to input processing commands and various types of information to the banknote depositing and dispensing apparatus 11, and allow the banknote depositing and dispensing apparatus 11 to output processing instructions and various types of information to the user.

Figure 2:
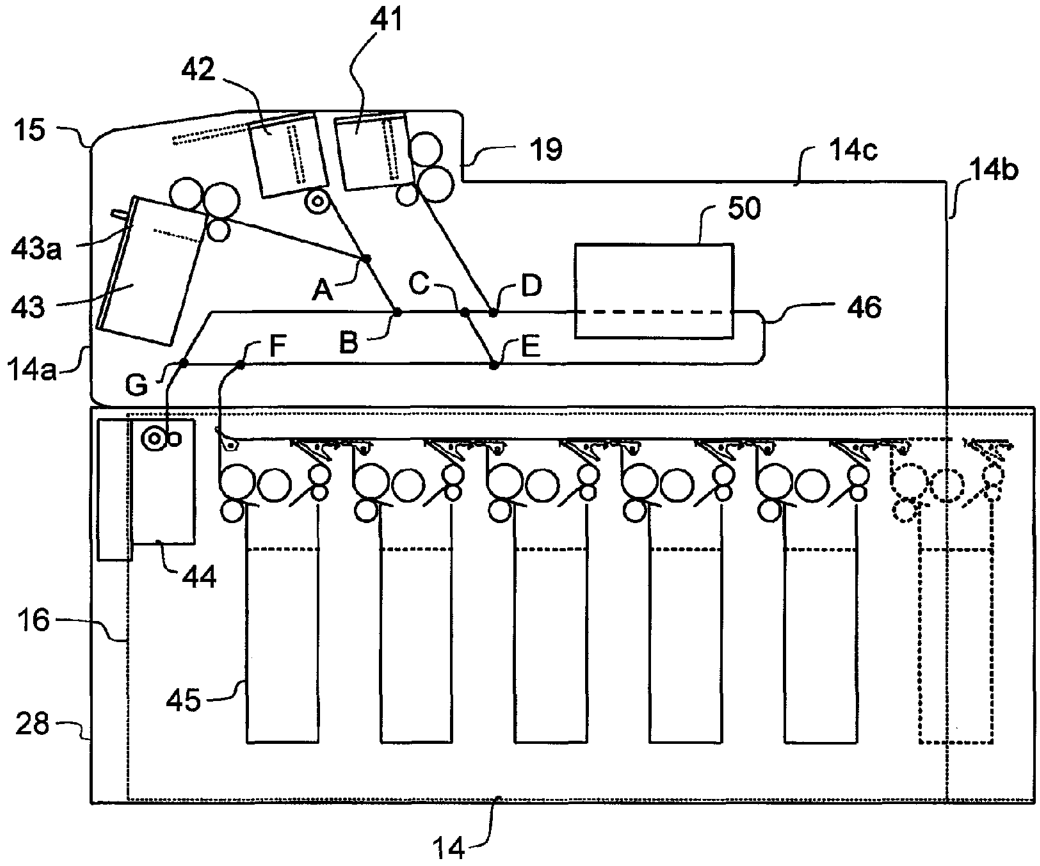
FIG. 2 is a structural diagram of a banknote depositing and dispensing apparatus according to the embodiment of the present invention.

An internal structure of the banknote depositing and dispensing apparatus 11 is shown in FIG. 2. The banknote depositing and dispensing apparatus 11 is, for example, installed between two tellers inside a counter of financial institutions, such as banks. Thus, two tellers can share one banknote depositing and dispensing apparatus 11.

The banknote depositing and dispensing apparatus 11 includes a communication interface. The terminal devices (12 and 13), one of which is operated by right-side teller and the other of which is operated by the left-side teller, are connected to the communication interface as shown in FIG. 1. This enables mutual communication between the terminal devices (12 and 13) and the banknote depositing and dispensing apparatus 11. Consequently, the banknote depositing and dispensing apparatus 11 can be operated from any one of the terminal devices (12 and 13).

A detailed structure of the banknote depositing and dispensing apparatus 11 is explained below with reference to FIGS. 1 and 2. The banknote depositing and dispensing apparatus 11 includes a housing 14 that has a front surface 14*a* on a side from which the tellers operate the banknote depositing and dispensing apparatus 11, and a rear surface 14*b* on the opposite side of the front surface 14*a*, i.e., toward an outer side of the counter and toward a client. The housing 14 is tower-type with a short left-right width, a long front-rear depth, and a high top-bottom height.

An upper unit 15 and a lower unit 16 are installed in the housing 14 so as to be drawable from a front side of the housing 14.

An upper operation unit 17 and a front operation unit 18 are arranged as operation units on a top front side and a front top side, respectively, of the upper unit 15. The upper operation unit 17 protrudes upward from a top surface 14*c* of the housing 14. A fitting step 19 that fits with the counter is formed on the top surface 14*c* of the housing 14 on a rear side of the upper operation unit 17. The counter that extends from the fitting step 19 up to the rear surface 14*b* of the housing 14 is fit onto the top surface 14*c* of the housing 14. Meanwhile, the top surface of the upper operation unit 17 is in level with the top surface of the counter.

An openable/closable door 28 is arranged in a front lower region of the housing 14. A lower unit lock 29 is arranged in the door 28 so that the door 28 can be locked/unlocked in a state where the door 28 is closed after installing the lower unit 16 in the housing 14. The lower unit 16 can be drawn out of the housing 14 toward the front side after unlocking and opening the door 28. Meanwhile, the lower unit lock 29 can be locked/unlocked only by a manager of the financial institution or an employee of a security company.

The banknote depositing and dispensing apparatus 11 internally includes an inlet 41, an outlet 42, an escrow unit 43, a reject box 44, a banknote storage unit 45, a banknote transport unit 46, a recognition unit 50, and the like.

The inlet 41 is a box-shaped receptacle that has an opening toward a top surface of the upper unit 15. This arrangement allows the user to introduce banknotes, which are to be deposited and the like, into the inlet 41. The introduced banknotes are, as explained later, transported inside the banknote depositing and dispensing apparatus 11 by the banknote transport unit 46.

The inlet 41 has a flap. The banknote depositing and dispensing apparatus 11 is ordinarily used in a state where the flap is shut. A certain number of banknotes can be introduced into the inlet 41 even when the flap is shut. By limiting the number of the banknotes that can be introduced into the inlet 41, occurrence of a fault due to introduction of a large number of banknotes that exceeds the processing capacity of the banknote depositing and dispensing apparatus 11 is prevented.

The flap is made of a transparent see-through material so that the user can check whether the introduced banknotes are reliably fed into the banknote depositing and dispensing apparatus 11. Additionally, the flap offers safety measures whereby, when the banknotes are being fed into the banknote depositing and dispensing apparatus 11, the user does not imprudently insert hands into the inlet 41 and the hands are caught in mechanical parts such as transport belts.

The flap is openable or closable, or it is easily detachable. By either opening or detaching the flap, a larger number of banknotes that are within the processing capacity of the banknote depositing and dispensing apparatus 11 can be easily introduced into the inlet 41, and recovery operation can be performed easily when a banknote feeding error occurred inside the inlet 41.

The outlet 42 is a box-shaped receptacle that has an opening toward the top surface of the upper unit 15. This arrangement allows banknotes, which are to be dispensed and the like, to be transported to the outlet 42 and dispensed therefrom. The user can pick up the banknotes that have been dispensed in the outlet 42.

The escrow unit 43 is arranged inside the upper unit 15, near the front side. The escrow unit 43 escrows the banknotes that have reached to it after being transported. An openable/closable door 43*a*, which has electromagnetic door lock and is made of transparent material, is arranged on a front side of the escrow unit 43. The user can directly take out the banknotes that have been escrowed in the escrow unit 43.

The reject box 44 is arranged inside the lower unit 16, near a front side. The reject box 44 stores therein unfit banknotes or dispensing rejected banknotes.

The banknote storage unit 45 is arranged inside the lower unit 16 and stores therein banknotes denomination-wise. Specifically, the banknote storage unit 45 includes a plurality of stackers arranged in front-rear direction for storing therein the banknotes denomination-wise. Opening the door 28 allows free mounting/dismounting of the stackers to/from the banknote depositing and dispensing apparatus 11.

The banknote depositing and dispensing apparatus 11 stores therein arrangement information that indicates a position of an each of stackers that corresponds to a specific denomination. The banknote processing system 1 executes a deposit process or a dispensing process based on the arrangement information.

When, for example, all the stackers have the same or similar shape, then when the user dismounts a certain stacker from the housing of the banknote depositing and dispensing apparatus 11, it is possible that the user by mistake mounts that stacker at a different position in the housing. Moreover, if the same or similar types of banknote depositing and dispensing apparatuses are installed nearby, then it is possible that a stacker that was dismounted from the housing of one banknote depositing and dispensing apparatus is by mistake mounted into the housing of a different banknote depositing and dispensing apparatus.

In the above-mentioned situations, because the arrangement information will not match with the existing position of that stacker, the deposit process or the dispensing process will not be executed properly. Therefore, in the banknote depositing and dispensing apparatus 11, for example, the following measures are taken to solve the problems discussed above.

First, each of the stackers is assigned ID information of the housing of the banknote depositing and dispensing apparatus, information relating to a denomination allocated to the stacker, information relating to number of banknotes stored in the stacker, and the like. As a method of assigning the information to the stackers, apart from storing the information in a built-in memory of the stackers, techniques of storing the information electronically or magnetically, etc. in an IC card or an RF-ID card can be exemplified. Moreover, in the housing of the banknote depositing and dispensing apparatus 11, a mechanism that reads the information assigned to the stackers is arranged at each mounting position of the stackers.

Figure 9:
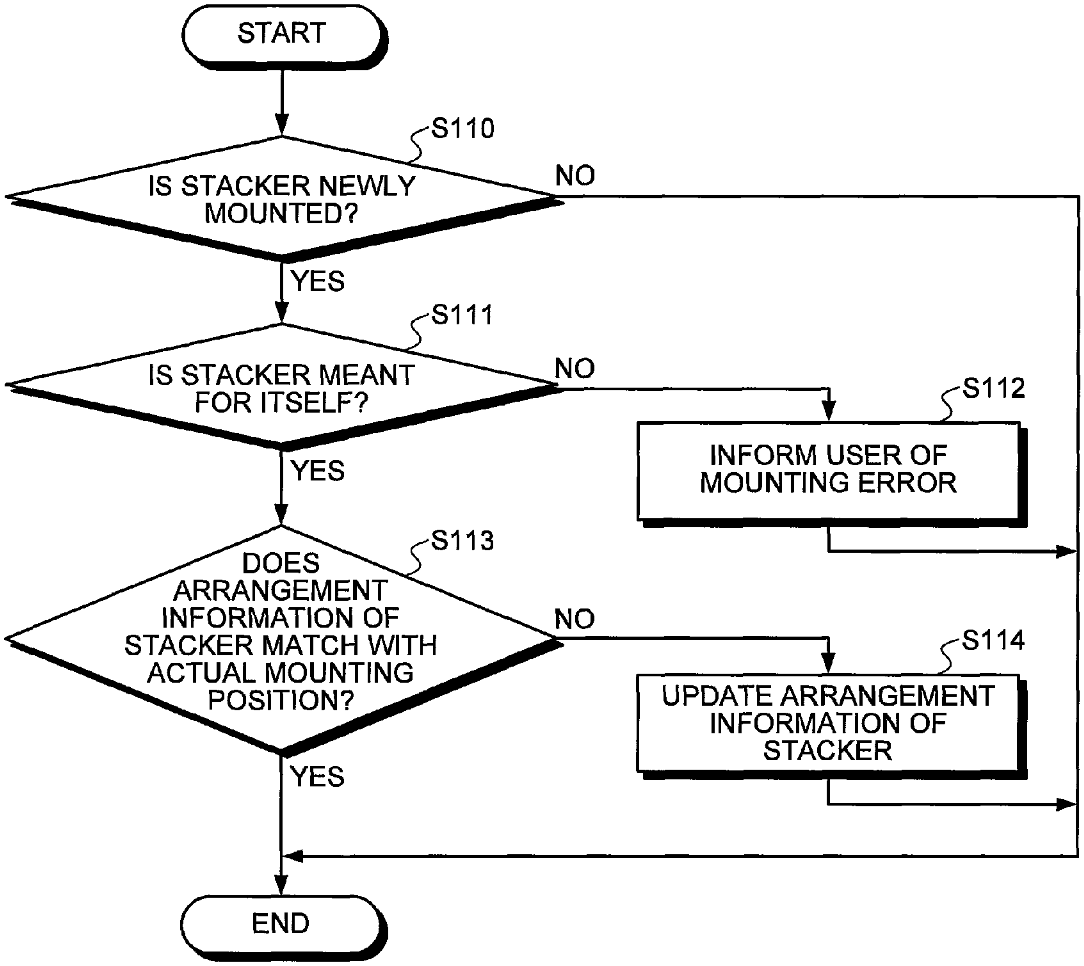
FIG. 9 is a flowchart of a process procedure of correction of arrangement information of stackers.

Thus, a series of process procedure from Steps S110 to S114 can be executed. The details of the process procedure are explained while referring to FIG. 9.

First, the banknote depositing and dispensing apparatus 11 determines whether a stacker is newly mounted (Step S110). The process procedure is terminated when no stacker is newly mounted (N at Step S110).

When a stacker is newly mounted (Y at Step S110), the banknote depositing and dispensing apparatus 11 determines whether the mounted stacker is meant for itself based on the information assigned to the mounted stacker (Step S111). Upon determining that the mounted stacker is not meant for itself (N at Step S111), the banknote depositing and dispensing apparatus 11 informs the user of an error in mounting of the stacker by, for example, a sound or light (Step S112). Thus, the user will come to know about a mounting error and can take appropriate action. Meanwhile, the process procedure is terminated after performing the process at Step S112.

Upon determining that the newly mounted stacker is meant for itself (Y at Step S111), the banknote depositing and dispensing apparatus 11 determines, based on the information assigned to the mounted stacker, whether the mounting position of the mounted stacker matches with the arrangement information stored in the mounted stacker (Step S113). Upon determining that there is no match (N at Step S113), the banknote depositing and dispensing apparatus 11 updates the arrangement information of the stacker so that the newly mounted position matches with the position of the arrangement information (Step S114).

With this processing, even if the user mounts a stacker at a wrong position, the arrangement information of the mounted stacker is updated automatically and the deposit process or the dispensing process can be performed without any difficulty. Meanwhile, when the banknote depositing and dispensing apparatus 11 determines that the mounting position of the mounted stacker matches with the arrangement information (Y at Step S113), or after completion of the process at Step S114, the process procedure is terminated.

In a configuration in which it is allowable to mount in the banknote depositing and dispensing apparatus 11 a stacker that is not meant for itself, as substitute process for the process at Step S112, a process to update the arrangement information that has been stored currently in the mounted stacker can be performed so that the arrangement information matches with the position at which the stacker has been newly mounted. Moreover, even when the process at Step S114 is performed, the fact that an error in mounting of the stacker has occurred can be informed to the user.

The banknote transport unit 46 connects each of the above-mentioned inlet 41, the outlet 42, the escrow unit 43, the reject box 44, and the banknote storage unit 45, and transports banknotes based on an instruction from a control unit explained later. Specifically, the banknote transport unit 46 is configured as a belt conveyer that is rotatable in a forward/reverse direction and includes a plurality of branching points A to G as shown in FIG. 2. With this configuration, the banknote transport unit 46 can efficiently transport banknotes to desired destinations.

The recognition unit 50 is arranged along the banknote transport unit 46 (between the branching points D and E. The recognition unit 50 includes an optical sensor and a thickness detection sensor, and can perform various tasks, such as acquiring a transmission image and a reflection image, detection of thickness, and the like, of the banknotes being transported. The recognition unit 50 can perform recognition of the currency type, denomination, authentication, and fitness of the banknotes transported to it by, for example, pattern matching by using the detected information.

The term "currency type" refers to, for example, types of currencies such as dollar used in the United State of America, Eurocurrency used in Europe, and yen used in Japan. Moreover, the term "denomination" refers to money values of banknotes (for example, $1, $5, $10, etc.). The term "authentication" refers to checking whether banknotes are counterfeit (whether the banknotes are genuine/fake). The term "fitness" refers to checking whether banknotes are reusable condition based on what extent banknotes have deteriorated (whether banknotes are fit/unfit).

Figure 3:
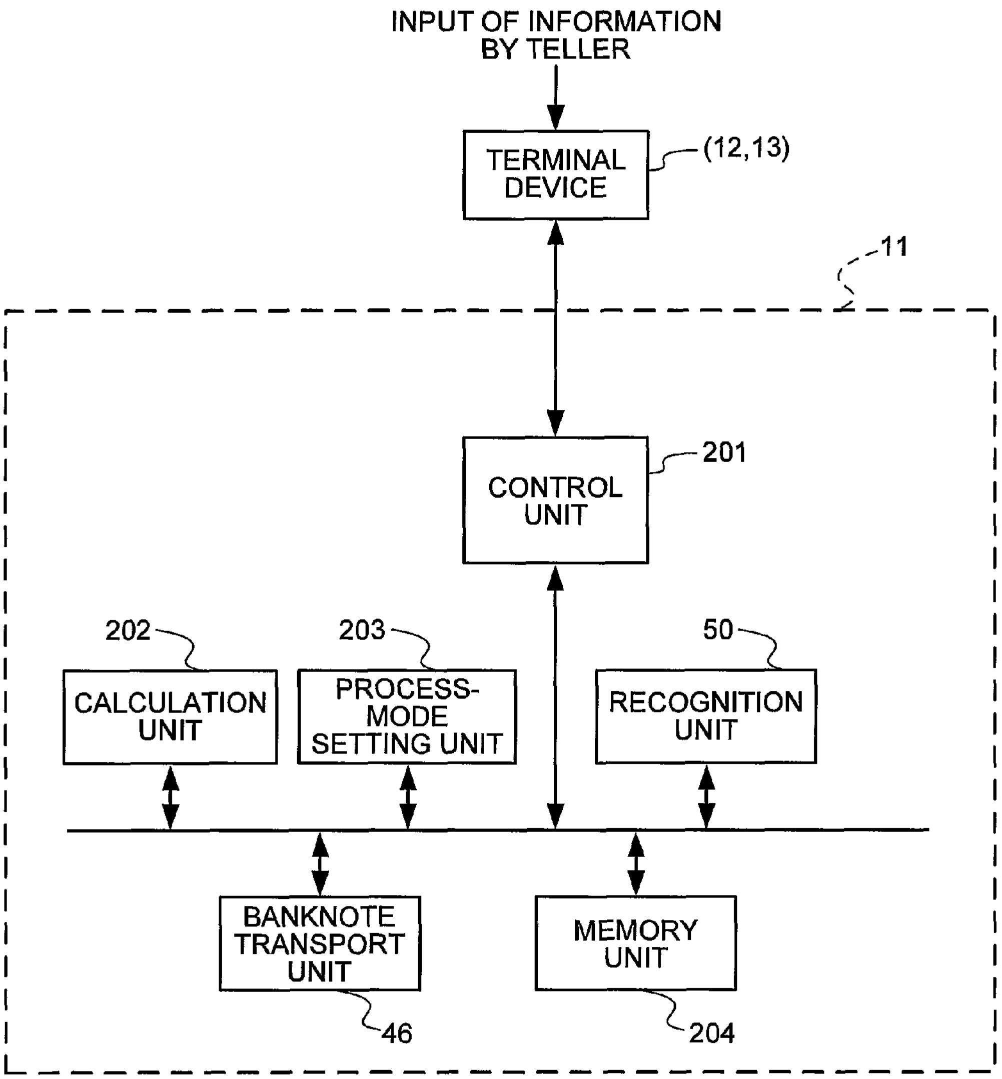
FIG. 3 is a block diagram of a control system according to the embodiment of the present invention.

A control system of the banknote processing system 1 is explained while referring to FIG. 3. As shown in FIG. 3, the banknote depositing and dispensing apparatus 11 includes a control unit 201, a calculation unit 202, a process-mode setting unit 203, the recognition unit 50, the banknote transport unit 46, a memory unit 204, and the like. FIG. 3 shows the control system, and the structural units shown in FIG. 3 that are the same or similar as those shown in FIG. 2 have been assigned the same reference numerals.

The control unit 201 is configured as, for example, a CPU and the like, and controls various structural units to realize various processes in the banknote depositing and dispensing apparatus 11. The control unit 201 also controls input/output of information between the banknote depositing and dispensing apparatus 11 and the terminal devices (12 and 13) connected to the banknote depositing and dispensing apparatus 11. The calculation unit 202 performs various calculations that are required in the banknote depositing and dispensing apparatus 11. Specifically, the calculation unit 202 performs calculation of deposited money when the deposit process is executed. The calculation of deposited money is performed by sequentially adding up the amount of each of deposited banknotes.

The calculation unit 202 can be realized by the control unit 201. The recognition unit 50 performs recognition of the currency type, denomination, authentication, and fitness, and transmits the recognition result to the control unit 201 etc.

The process-mode setting unit 203 sets, based on an instruction from the user, a processing mode of the banknote depositing and dispensing apparatus 11 to any one from among a plurality of processing modes previously prepared. The types and concrete details of the processing modes will be explained later.

The banknote transport unit 46 transports the banknotes based on an instruction from the control unit 201.

The memory unit 204 is, for example, a rewritable non-volatile memory, and stores therein various pieces of information under the control by the control unit 201. The memory unit 204 stores therein various pieces of information relating to a main currency (target money for processes) that is mainly handled in the banknote processing system 1, and a sub-currency (non-target money for processes) that is different from the main currency but that can be handled in the banknote processing system 1. The memory unit 204 also stores therein information relating to a conversion rate for converting a money value between the main currency and the sub-currency and vice versa.

Concretely, regarding the main currency and the sub-currency, the main currency can be, for example, the banknotes that are currently in circulation, and the sub-currency can be the banknotes that are old version notes and not currently in circulation. Alternatively, the money of user's country can be set as the main currency and the money of other countries can be set as the sub-currency. That is, the money that is to be mainly used in the depositing and dispensing apparatus 11 can be set as the main currency, and the money that is genuine but different from the main currency can be set as the sub-currency.

In the banknote processing system 1, when the sub-currency is deposited, because it is not the main currency that is in circulation in the market, the deposited sub-currency is not re-used. However, because the sub-currency is genuine money, as against counterfeit money, money value of the sub-currency is converted into equivalent money value of the main currency based on the information on the conversion rate and the like stored in the memory unit 204, and added as deposited money. These process details will be explained later.

Next, the main processes executed in the banknote processing system 1 are explained below while referring to FIGS. 4 to 8.

The banknote processing system 1 executes various processes based on a processing mode (among a first processing mode to a fifth processing mode) that has been set at the time of use.

Figure 4:
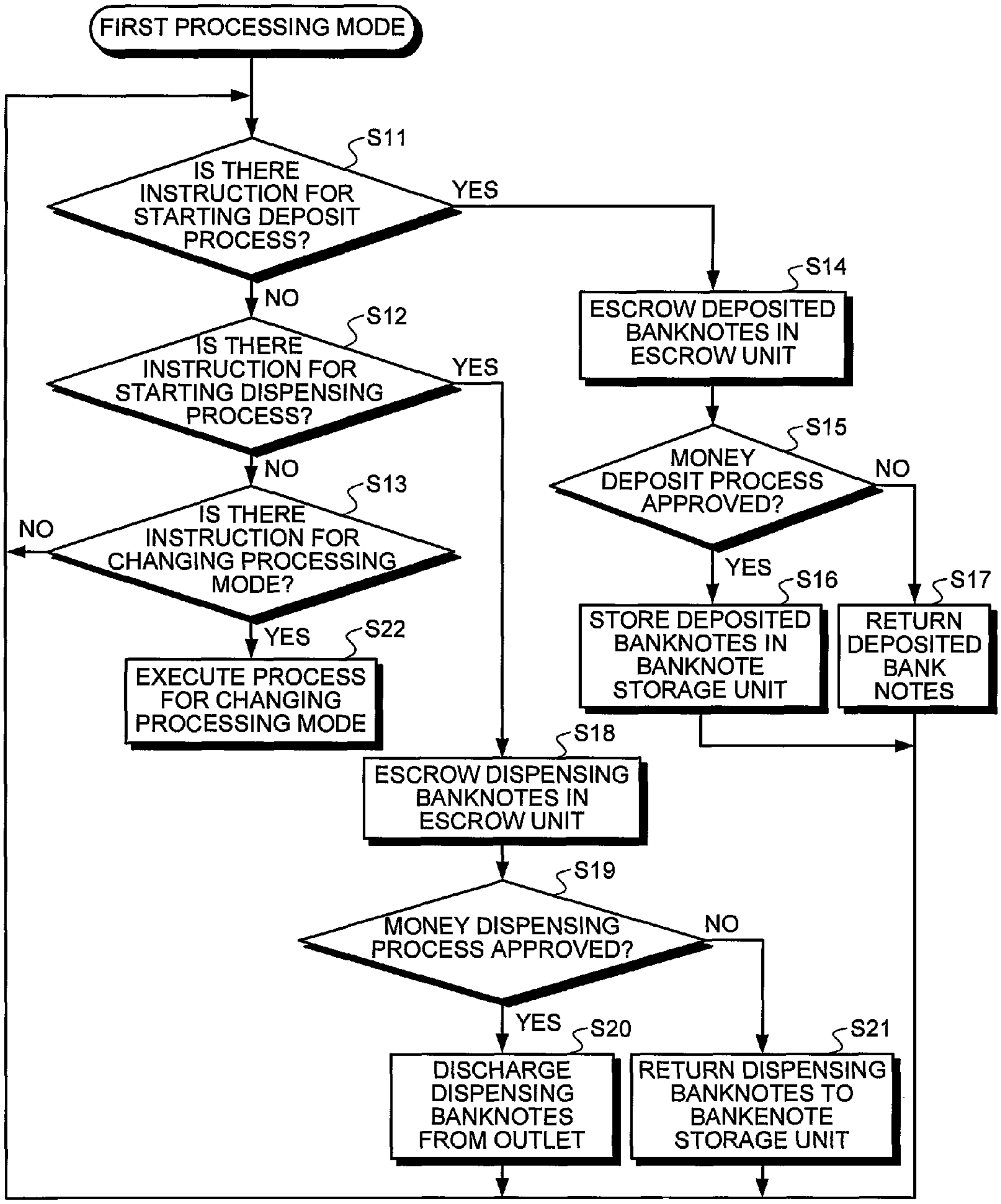
FIG. 4 is a flowchart of a process procedure of a first processing mode according to the embodiment of the present invention.

First, a case is explained while referring to FIG. 4 assuming that the first processing mode has been set as the current processing mode. The first processing mode is an escrow mode in which, as in the conventional technology, the deposit process and the dispensing process are performed by using the escrow unit 43.

In the first processing mode, the banknote processing system 1 monitors whether there is an instruction from the user to start a deposit process (Step S11), whether there is an instruction from the user to start a dispensing process (Step S12), and whether there is an instruction from the user to change a processing mode (Step S13). Meanwhile, the user can make various instructions by operating the terminal devices (12 and 13).

When there is an instruction for starting the deposit process (Y at Step S11), the banknote processing system 1 transports the deposited banknotes introduced into the inlet 41 to the escrow unit 43 and escrows therein (Step S14). More concretely, the deposited banknotes are transported from the inlet 41 to the escrow unit 43 via the branching point D, the recognition unit 50, the branching points E, C, B, and A in this order, and stored in the escrow unit 43.

While the deposited banknotes are being transported, the recognition unit 50 recognizes a denomination of each of the deposited banknotes. The value of each of the banknotes is added to calculate a deposited amount by the calculation unit 202. The deposited amount is displayed, for example, on display units of the terminal devices (12 and 13).

The recognition unit 50, in addition to the denomination recognition, recognizes whether each of the deposited banknotes is a fit banknote or an unfit banknote. Those deposited banknotes that are recognized as unfit banknotes are, after escrowing in the escrow unit 43, transported to the reject box 44 and stored therein. The recognition unit 50 can also recognize authentication of the deposited banknotes. Those deposited banknotes that are determined as counterfeit banknotes are rejected without transporting them to the escrow unit, or transported to a not shown dedicated storage unit and stored therein.

Subsequently, the banknote processing system 1, while continuing the display of the deposited amount, waits for an instruction from the user about approval/disapproval of the deposit process (Step S15). The user can instruct approval/disapproval of the deposit process by operating the terminal devices (12 and 13).

Upon receiving an instruction approving the deposit process (Y at Step S15), the banknote processing system 1 recognizes each of the deposited banknotes escrowed in the escrow unit 43, and, based on the recognition result, transports the deposited banknotes to the banknote storage units 45 and stores therein (Step S16). Information on the deposited amount and the like is sent to the terminal devices (12 and 13) and recorded therein. The deposit process ends here.

On the other hand, upon receiving an instruction disapproving the deposit process (N at Step S15), the banknote processing system 1 unlocks the electromagnetic door lock and opens the door 43*a* located in the front side of the escrow unit 43. The user can take out the banknotes escrowed in the escrow unit 43 and return those banknotes to the owner of the banknote (Step S17). Upon returning the banknotes to the owner, a process for cancellation of the deposit process ends here. The process control is returned to Step S11 after completion of Step S16 or S17.

When there is an instruction for starting the dispensing process (Y at Step S12), the banknote processing system 1 transports, from among the banknotes that have been stored in the banknote storage unit 45, banknotes equivalent to the designated dispensing amount to the escrow unit 43 and escrows therein as dispensing banknotes (Step S18). More concretely, the dispensing banknotes are transported from the banknote storage unit 45 to the escrow unit 43 via the branching points F and E, the recognition unit 50, the branching points D, C, B, and A in this order, and escrowed in the escrow unit 43.

Subsequently, the banknote processing system 1, waits for an instruction from the user about approval/disapproval of the dispensing process (Step S19). The user can instruct approval/disapproval of the dispensing process by operating the terminal devices (12 and 13). While the banknote processing system 1 is waiting, for example, information such as number of dispensing banknotes per denomination can be displayed on the display units of the terminal devices (12 and 13).

Upon receiving an instruction approving the dispensing process (Y at Step S19), the banknote processing system 1 transports the dispensing banknotes escrowed in the escrow unit 43 to the outlet 42 (Step S20). Information on the dispensing amount and the like is sent to the terminal devices (12 and 13) and stored therein. The dispensing process ends here.

On the other hand, upon receiving an instruction disapproving the dispensing process (N at Step S19), the banknote processing system 1 returns the dispensing banknotes escrowed in the escrow unit 43 to the banknote storage unit 45 (Step S21). A process for cancellation of the dispensing process ends here. The process control is returned to Step S11 after completion of Step S20 or S21.

When there is an instruction for changing the processing mode (Y at Step S13), the banknote processing system 1 executes a process for changing the processing mode (Step S22). More concretely, the banknote processing system 1 causes the user to select a desired processing mode through display on the terminal devices (12 and 13). The user can select any one of the processing modes from among the first processing mode to the fifth processing mode by operating the terminal devices (12 and 13).

Upon selecting one processing mode, the process-mode setting unit 203 changes the current processing mode to the selected processing mode. The banknote processing system 1 then executes various processes based on the newly set processing mode. Concretely, for example, setting of the first processing mode initiates the processes from Step S11, and setting of the second processing mode initiates the processes from Step S31.

The processing modes from the second processing mode to the fifth processing mode are non-escrow modes where the deposit process and the dispensing process are performed without using the escrow unit 43. The non-escrow mode allows diverse use by allowing the escrow unit 43 to be used for other purposes. The details of the non-escrow mode are explained below.

Figure 5:
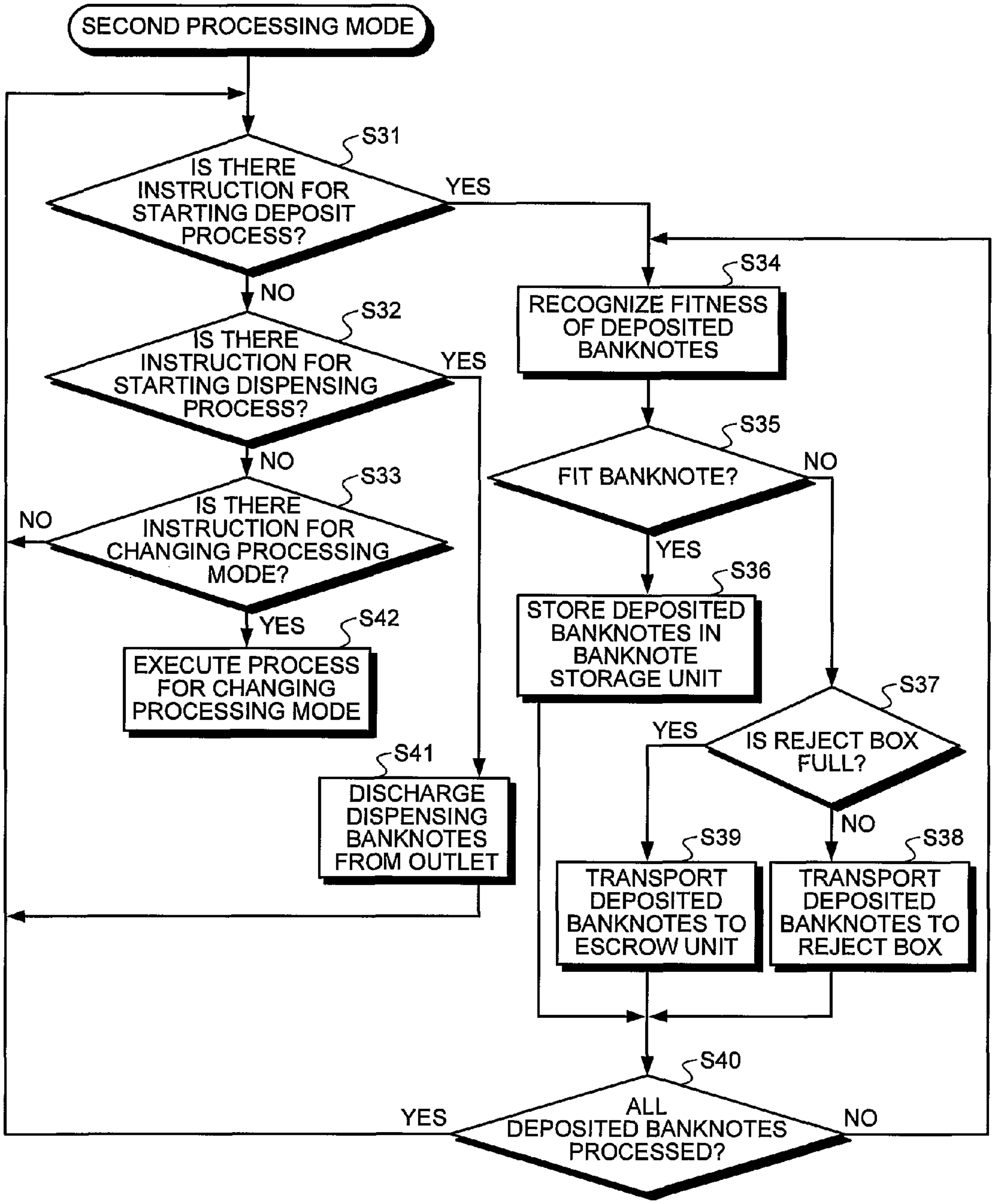
FIG. 5 is a flowchart of a process procedure of a second processing mode according to the embodiment of the present invention.

First, the processes that are executed when the second processing mode is set are explained while referring to FIG. 5. The second processing mode is a mode in which the escrow unit 43 is not used for the deposit and dispensing process as in the conventional technology, but it is used to store therein the unfit banknotes.

In the second processing mode, the banknote processing system 1 monitors whether there is an instruction from the user to start a deposit process (Step S31), whether there is an instruction from the user to start a dispensing process (Step S32), and whether there is an instruction from the user to change a processing mode (Step S33). Meanwhile, the user can make various instructions by operating the terminal devices (12 and 13).

When there is an instruction for starting the deposit process (Y at Step S31), the banknote processing system 1 transports the deposited banknotes introduced into the inlet 41 one by one to the recognition unit 50 via the branching point D. The recognition unit 50 performs recognition of fitness of the deposited banknotes transported to it (Step S34).

Upon recognizing that the deposited banknote is a fit banknote (Y at Step S35), that deposited banknote is transported to the banknote storage unit 45 and stored therein (Step S36).

On the other hand, upon recognizing that the deposited banknote is an unfit banknote (N at Step S35), if there is a free space in the reject box 44 (N at Step S37), the deposited unfit banknote is transported to the reject box 44 via the branching points E, F, and G in this order. Meanwhile, whether there is a free space in the reject box 44 is determined based on a detection result of a sensor that is arranged in the reject box 44 to detect a current storage volume of the reject box 44.

When the reject box 44 is full (Y at Step S37), the deposited unfit banknotes are transported to the escrow unit 43 via the branching points E, C, B, and A in this order, and stored therein (Step S39). The fact that the reject box 44 is full and therefore the deposited banknotes are being transported to the escrow unit 43 is informed the user, for example, by a sound, light, or a display on the display unit of the terminal devices (12 and 13). The recognition unit 50 performs recognition of the denomination of the banknotes along with recognition of fit/unfit banknotes, and the recognized value is added to a deposited amount.

The various processes performed from Steps S34 to S39 are continued until all the deposited banknotes introduced into the inlet 41 are processed (Step S40). When all the banknotes are processed, (Y at Step S40), information relating to the deposited amount is sent to the terminal devices (12 and 13) and recorded therein. The deposit process ends here. After that, the process control is returned to Step S31.

When there is an instruction for starting the dispensing process (Y at Step S32), the banknote processing system 1 transports, from among the banknotes stored in the banknote storage unit 45, banknotes equivalent to the designated dispensing amount to the outlet 42 and dispenses therefrom as dispensing banknotes (Step S41). More concretely, the dispensing banknotes are transported from the banknote storage unit 45 to the outlet 42 via the branching points F and E, the recognition unit 50, the branching points D, C, B, and A in this order. Information on the dispensing amount and the like is sent to the terminal devices (12 and 13) and recorded therein. The dispensing process ends here. After that, the process control is returned to Step S31.

When there is an instruction for changing the processing mode (Y at Step S33), the banknote processing system 1 executes a process for changing the processing mode (Step S42). The contents of the process for changing the processing mode are the same as that of Step S22 and hence the explanation thereof is omitted.

Upon completion of the deposit process, when it is detected that some free space is in the reject box 44, the unfit banknotes escrowed in the escrow unit 43 are automatically transported to the reject box 44. By doing so, for example, when the user takes out the unfit banknotes from the reject box 44, the unfit banknotes escrowed in the escrow unit 43 can be collected in the reject box 44. Moreover, upon completion of the deposit process, if the unfit banknotes are still stored in the escrow unit 43 the fact is informed the user by, for example, a sound, light, or a display on the display unit of the terminal devices (12 and 13).

In the depositing and dispensing apparatus 11, the banknotes are stored in the banknote storage unit 45 arranged inside the lower unit 16. For example, the lower unit 16 is installed in a safe and maintained at a higher security level as compared to the upper unit 15. In contrast, because the escrow unit 43 is arranged inside the upper unit 15, the banknotes can be easily taken out from the escrow unit 43 when the deposit process is cancelled. That is, the security level of the escrow unit 43 arranged inside the upper unit 15 is low as compared to the reject box 44 arranged inside the lower unit 16. Therefore, by operating in the above manner, staying behind of the banknotes in the escrow unit 43 can be prevented, and the banknotes can be stored in the safer reject box 44. Moreover, the user can be prompted to take out the banknotes in the escrow unit 43. By doing so, while the escrow unit 43 can be used for storing the unfit banknotes, measures can be taken so that the banknotes do not stay behind in the escrow unit 43 to maintain a higher security level.

Figure 6:
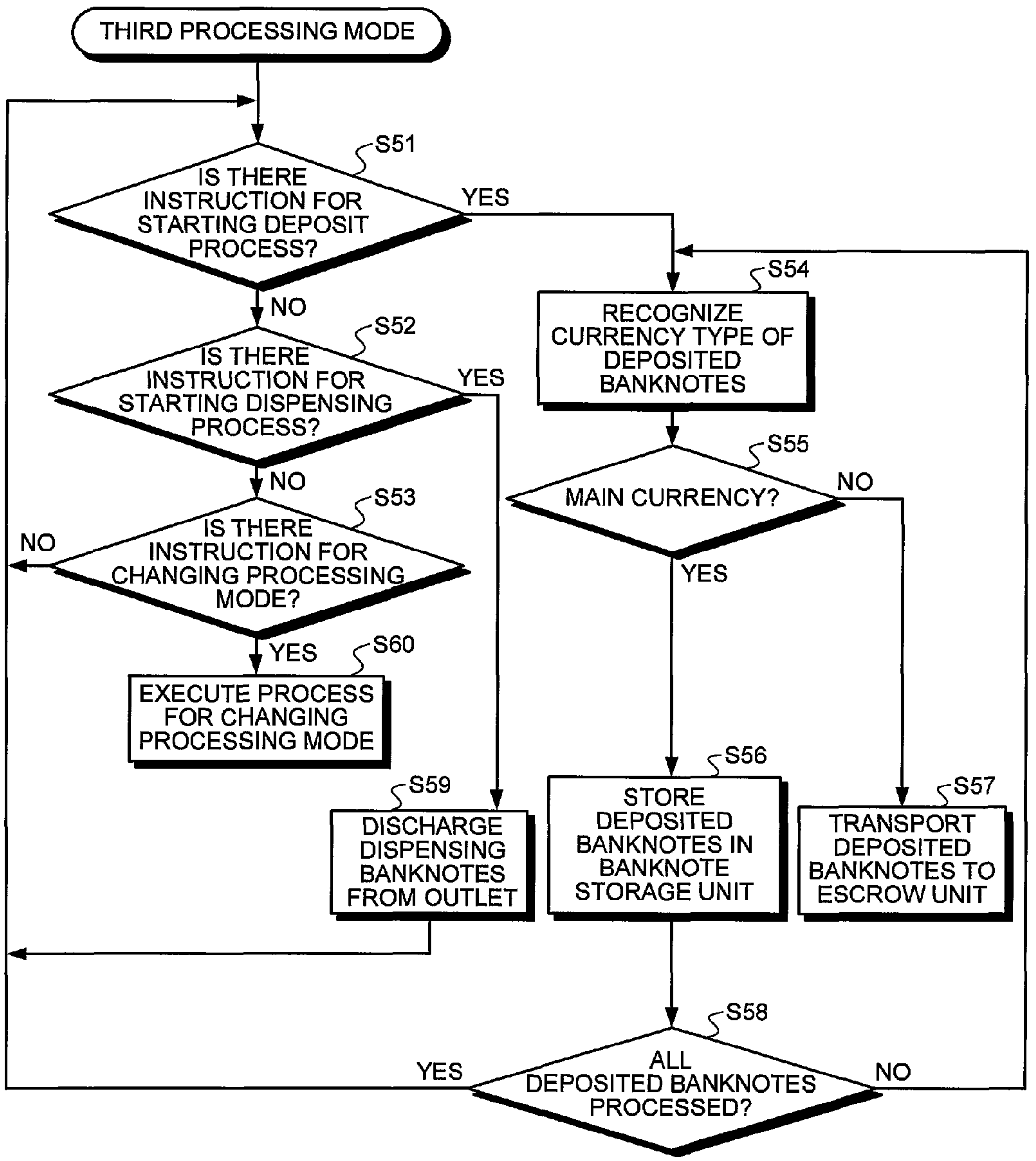
FIG. 6 is a flowchart of a process procedure of a third processing mode according to the embodiment of the present invention.

Next, various processes executed when the third processing mode is set are explained while referring to FIG. 6. The third processing mode is the non-escrow mode in which the escrow unit 43 is not used for the deposit process and the dispensing process as in the conventional technology, but it is used to store therein the sub-currency that is not the processing target of the depositing and dispensing apparatus 11.

In the third processing mode, the banknote processing system 1 monitors whether there is an instruction from the user to start a deposit process (Step S51), whether there is an instruction from the user to start a dispensing process (Step S52), and whether there is an instruction from the user to change a processing mode (Step S53). Meanwhile, the user can make various instructions by operating the terminal devices (12 and 13).

When there is an instruction for starting the deposit process (Y at Step S51), the banknote processing system 1 transports the deposited banknotes introduced into the inlet 41 to the recognition unit 50 one by one via the branching point D. The recognition unit 50 performs recognition of type of the deposited banknotes transported to it (Step S54).

Upon recognizing that the deposited banknote is of the main currency (Y at Step S55), the deposited banknote is transported to the banknote storage unit 45 via the branching points E and F in this order and stored therein (Step S56). When doing so, the value of each of the deposited banknote of the main currency, is added to calculate a deposited amount. In contrast, upon recognizing that the deposited banknote is of the sub-currency (N at Step S55), the deposited banknote is transported to the escrow unit 43 via the branching points E, C, B, and A in this order, and stored therein (Step S57).

The value of the sub-currency is converted to the value of the main currency based on the conversion rate stored in the memory unit 204, and the value obtained by the conversion is added to the deposited amount. Concretely, for example, assuming that the main currency is dollar, and a type of the banknote is recognized as Japanese yen which is one of the sub-currency, then the yen value of that banknote is converted into an equivalent dollar value based on a yen-dollar conversion rate, and the dollar value obtained by the conversion is added to the deposited amount.

The deposited banknotes that are recognized neither as the main currency nor as the sub-currency are dispensed without storing them, or stored in a specific storage unit such as the reject box 44. The deposited banknotes that are recognized as the unfit banknotes are transported to the reject box 44 after adding their value to the deposited amount.

The various processes performed from Steps S54 to S57 are executed for each of the deposited banknotes (i.e., for each of the deposited banknotes introduced into the inlet 41) (Step S58). Upon completion of the processes for each of the deposited banknotes (Y at Step S58), information on the deposited amount is sent to the terminal devices (12 and 13) and recorded therein. The deposit process ends here. After that, the process control is returned to Step S51.

When there is an instruction for starting the dispensing process (Y at Step S52), the banknote processing system 1 transports, from among the banknotes stored in the banknote storage unit 45, banknotes equivalent to the designated dispensing amount to the outlet 42 and dispenses those banknotes as dispensing banknotes (Step S59). More concretely, the dispensing banknotes are transported from the banknote storage unit 45 to the outlet 42 via the branching points F and E, the recognition unit 50, the branching points D, C, B, and A in this order. When doing so, information on the dispensing amount is sent to the terminal devices (12 and 13) and recorded therein. The dispensing process ends here. After that, the process control is returned to Step S51.

When there is an instruction for changing the processing mode (Y at Step S53), the banknote processing system 1 executes a process for changing the processing mode (Step S60). The contents of the process for changing the processing mode are the same as that of Step S22 and hence the explanation thereof is omitted.

Figure 7:
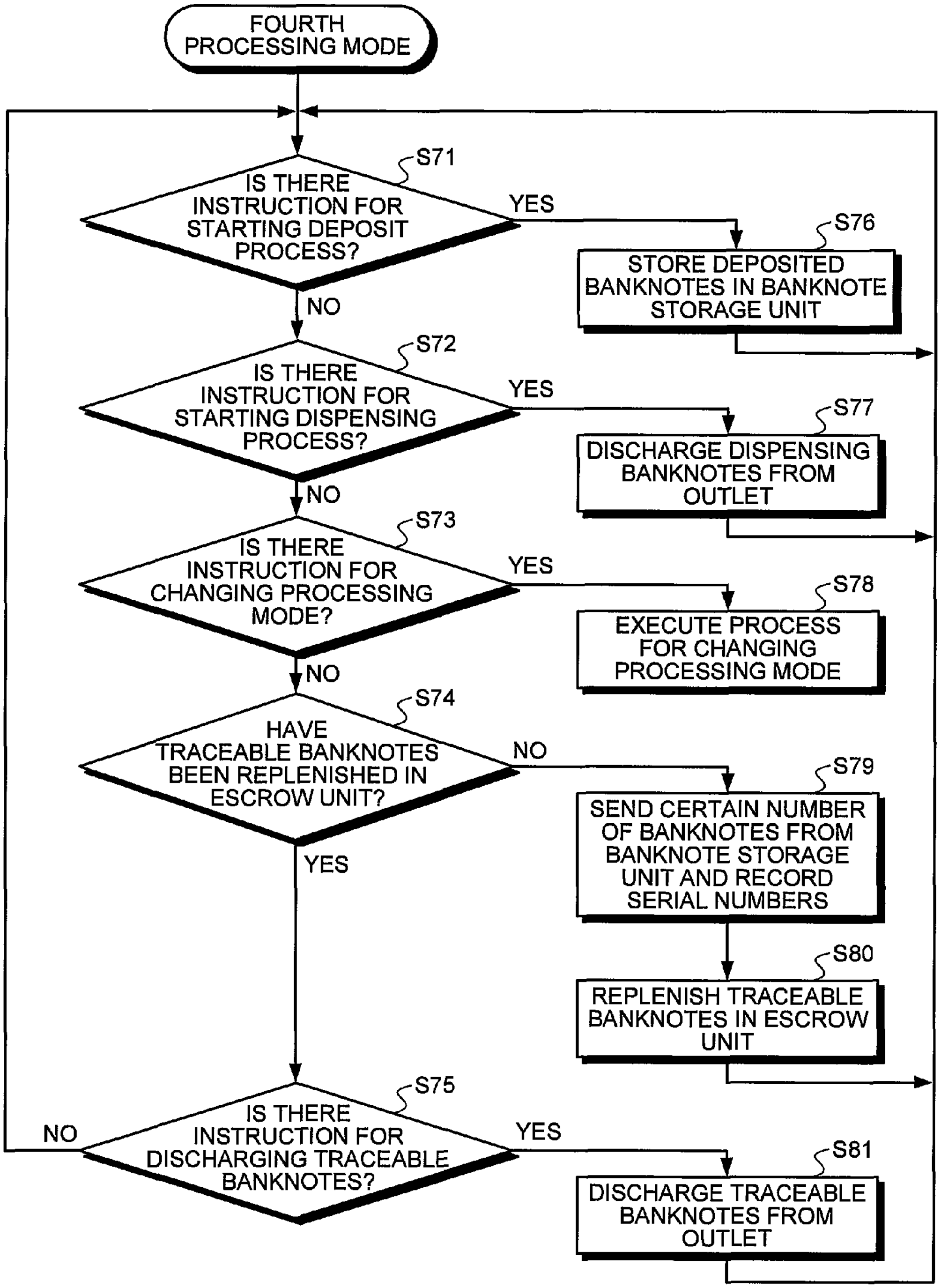
FIG. 7 is a flowchart of a process procedure of a fourth processing mode according to the embodiment of the present invention.

Next, various processes executed when the fourth processing mode is set are explained while referring to FIG. 7. The fourth processing mode is the non-escrow mode in which the escrow unit 43 is not used for the deposit process and the dispensing process as in the conventional technology, but it is used to store therein traceable banknotes to cope with robbery and the like.

The traceable banknote is a banknote whose information, such as a serial number, based on which the banknote can be identified, is previously recorded, so that a circulation course of which can be traced after an incident occurs.

In the fourth processing mode, the banknote processing system 1 monitors whether there is an instruction from the user to start a deposit process (Step S71), whether there is an instruction from the user to start a dispensing process (Step S72), and whether there is an instruction from the user to change a processing mode (Step S73). Moreover, the banknote processing system 1 monitors whether the traceable banknotes have been prepared in the escrow unit 43 (Step S74), and whether there is an instruction from the user to dispense the traceable banknotes (Step S75).

Meanwhile, various instructions by the user can be realized by, for example, operating the terminal devices (12 and 13). The decision at Step S74 can be made as follows. For example, an output signal of a sensor that detects whether there are banknotes in the escrow unit 43 can be used, or a signal input by the user can be used to make the decision.

When there is an instruction for starting the deposit process (Y at Step S71), the banknote processing system 1 transports the deposited banknotes introduced into the inlet 41 to the banknote storage unit 45 via the branching point D, the recognition unit 50, the branching points E and F in this order, and stores therein (Step S76). The recognition unit 50 performs recognition of fitness of the deposited banknotes, and those banknotes that are recognized as unfit banknotes are transported to the reject box 44. The fourth processing mode is the same as the first processing mode in this respect.

The value of the money recognized by the recognition unit 50, including the unfit banknotes, is added to the deposited amount. Moreover, the final information on the deposited amount and the like is sent to the terminal devices (12 and 13) and recorded therein. The deposit process ends here. After that, the process control is returned to Step S71.

When there is an instruction for starting the dispensing process (Y at Step S72), the banknote processing system 1 transports, from among the banknotes stored in the banknote storage unit 45, banknotes equivalent to the designated dispensing amount to the outlet 42 and dispenses those banknotes as dispensing banknotes (Step S77). More concretely, the dispensing banknotes are transported from the banknote storage unit 45 to the outlet 42 via the branching points F and E, the recognition unit 50, the branching points D, C, B, and A in this order. Information on the dispensing amount is sent to the terminal devices (12 and 13) and recorded therein. The dispensing process ends here. After that, the process control is returned to Step S71.

When there is an instruction for changing the processing mode (Y at Step S73), the banknote processing system 1 executes a process for changing the processing mode (Step S78). The contents of the process for changing the processing mode are the same as that of Step S22 and hence the explanation thereof is omitted.

When the traceable banknotes are not in the escrow unit 43 (N at Step S74), the banknote processing system 1 transports a fixed number of banknotes from the banknote storage unit 45 to the branching points F and E, the recognition unit 50, the branching point D in this order (Step S76). Moreover, a serial number of the banknote read out in the recognition unit 50 is recorded in the memory unit 204 (Step S79). At this time, information such as the date and time of reading the serial number can also be stored along with the serial number. It can have a configuration in which this information is sent to the terminal devices (12 and 13) and stored in a memory device of the terminal devices (12 and 13).

It is possible to omit the processes performed at Steps S74, S79, and S80, and to ask the user to manually replenish the traceable banknotes. Alternatively, it can be configured so that, after depositing a fixed number of banknotes from the inlet 41 by the user and reading out the serial numbers of the deposited banknotes and recording them, the deposited banknotes can be transported to the escrow unit 43 and stored therein. By doing so, the traceable banknotes whose serial numbers are recorded can be replenished in the escrow unit 43 (Step S80).

When there is an instruction for dispensing the traceable banknotes (Y at Step S75), the banknote processing system 1 transports the traceable banknotes escrowed in the escrow unit 43 to the outlet 42 via the branching points A, B, C, and E, the recognition unit 50, and the branching points D, C, B, and A in this order, and dispenses the traceable banknotes from the outlet 42 (Step S81).

With this operation, when coping with a robbery and the like, the user can pick up the traceable banknotes dispensed from the outlet 42 and handover those banknotes to the robber. Alternatively, it is possible to directly take out the traceable banknotes from the escrow unit 43 and handover them to the robber. By doing so, a circulation course of the robbed banknotes can be traced. After the processes performed at Steps S80 and S81 are completed, the process control is returned to Step S71.

Figure 8:
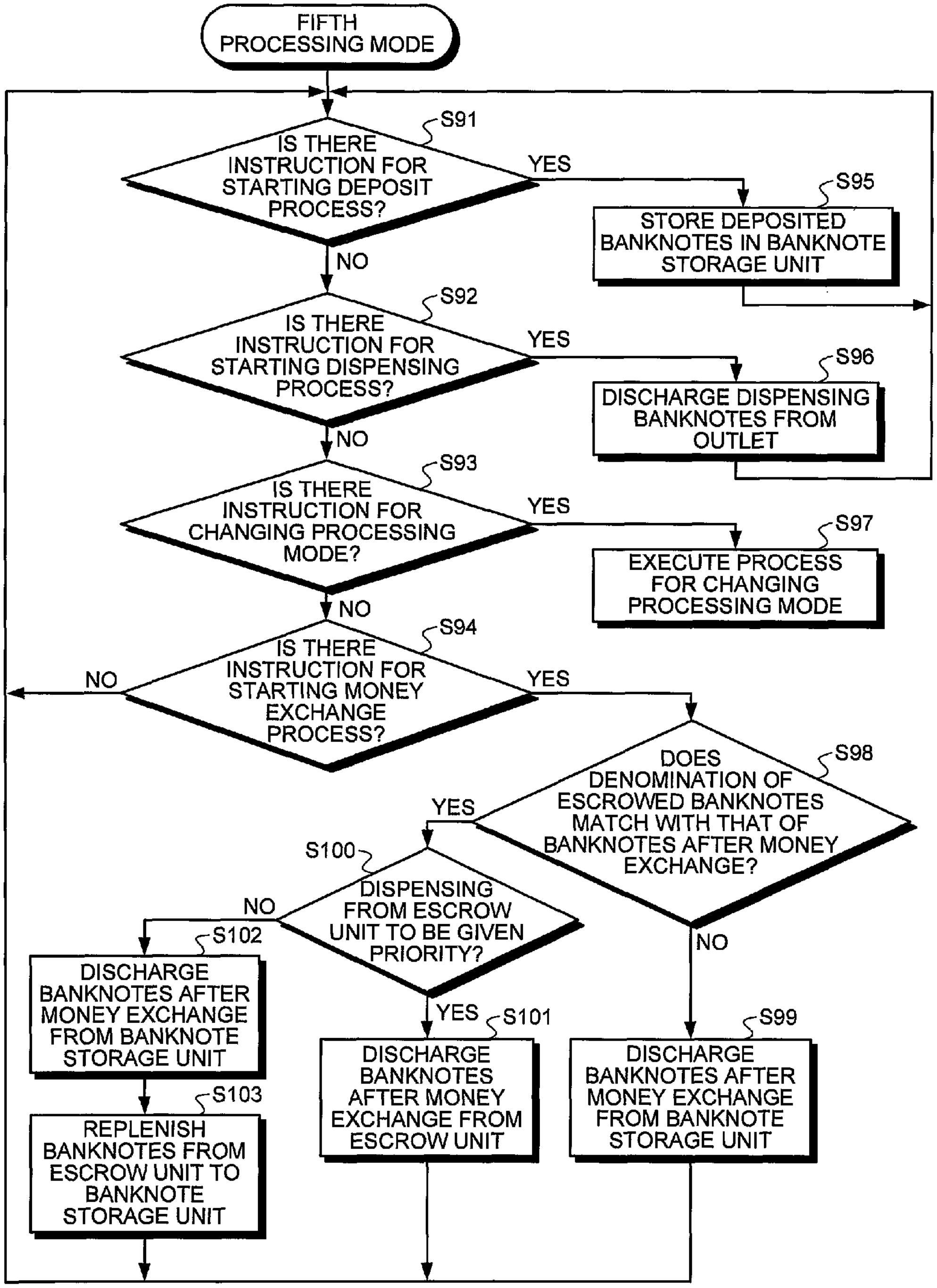
FIG. 8 is a flowchart of a process procedure of a fifth processing mode according to the embodiment of the present invention.

Next, various processes executed when the fifth processing mode is set are explained while referring to FIG. 8. The fifth processing mode is the non-escrow mode in which the escrow unit 43 is not used for the deposit process and dispensing process as in the conventional technology, but it is used to store therein denominations that are often used in money exchange process.

In the fifth processing mode, the banknote processing system 1 monitors whether there is an instruction from the user to start a deposit process (Step S91), whether there is an instruction from the user to start a dispensing process (Step S92), whether there is an instruction from the user to change a processing mode (Step S93), and whether there is an instruction from the user to start a money exchange process (Step S94).

Meanwhile, various instructions by the user can be realized by, for example, operating the terminal devices (12 and 13). The money exchange process here includes a process of receiving banknotes of certain denominations (hereinafter, "banknotes before money exchange"), and dispensing banknotes of different denominations (hereinafter, "banknotes after money exchange") of a total value same as that of the banknotes before money exchange. For example, the money exchange process includes a process of receiving one banknote of 200 Eurocurrency as the banknotes before money exchange and dispensing 40 banknotes of 5 Eurocurrency as the banknotes after money exchange. When instructing the start of the money exchange process, the user also indicates the denomination of the banknotes after money exchange.

When there is an instruction for starting the deposit process (Y at Step S91), the banknote processing system 1 transports the deposited banknotes introduced into the inlet 41 to the banknote storage unit 45 via the branching point D, the recognition unit 50, the branching points E and F in this order, and stores therein (Step S95). The recognition unit 50 performs recognition of fitness of the deposited banknotes, and the banknotes that are recognized as unfit banknotes are transported to the reject box 44. The fifth processing mode is the same as the first processing mode in this respect.

The value of the money recognized by the recognition unit 50, including the unfit banknotes, is added to the deposited amount. Moreover, the final information on the deposited amount and the like is sent to the terminal devices (12 and 13) and recorded therein. The deposit process ends here. After that, the process control is returned to Step S91.

When there is an instruction for starting the dispensing process (Y at Step S92), the banknote processing system 1 transports, from among the banknotes stored in the banknote storage unit 45, banknotes equivalent to the designated dispensing amount to the outlet 42 and dispenses those banknotes as dispensing banknotes (Step S96). More concretely, the dispensing banknotes are transported from the banknote storage unit 45 to the outlet 42 via the branching points F and E, the recognition unit 50, the branching points D, C, B, and A in this order. When doing so, information on the dispensing amount is sent to the terminal devices (12 and 13) and recorded therein. The dispensing process ends here. After that, the process control is returned to Step S91.

When there is an instruction for changing the processing mode (Y at Step S93), the banknote processing system 1 executes a process for changing the processing mode (Step S97). The contents of the process for changing the processing mode are the same as that of Step S22 and hence the explanation thereof is omitted.

When there is an instruction to start the money exchange process (Y at Step S94), the banknote processing system 1 transports the banknotes before money exchange introduced into the inlet 41 to the recognition unit 50 where denomination of the banknotes before money exchange is recognized. Subsequently, the banknotes before money exchange are transported to the banknote storage unit 45 and stored therein.

The banknote processing system 1 determines whether the denomination of banknotes escrowed in the escrow unit 43 (hereinafter, "escrowed banknotes") matches with that of the banknotes after money exchange previously specified by the user (Step S98). In the banknote processing system 1, when the fifth processing mode has been set, the user can specify the denomination of the escrowed banknotes. Meanwhile, the escrowed banknotes can be previously stored in the escrow unit 43.

Upon determining that the denomination of the escrowed banknotes does not match with that of the banknotes after money exchange (N at Step S98), the banknote processing system 1 transports the banknotes after money exchange from the banknote storage unit 45 to the outlet 42, and dispenses therefrom (Step S99).

In contrast, upon determining that the denomination of the escrowed banknotes matches with that of the banknotes after money exchange (Y at Step S98), the banknote processing system 1 determines which one between a money dispensing from the escrow unit 43 and a money dispensing from the banknote storage unit 45 is to be given higher priority (Step S100). In the banknote processing system 1, when the fifth processing mode has been set, the user can specify the priority.

Upon determining that the money dispensing from the escrow unit 43 is to be given higher priority (Y at Step S98), the banknote processing system 1 transports the banknotes after money exchange from the escrow unit 43 to the outlet 42, and dispenses therefrom (Step S101). That is, all or a part of the escrowed banknotes are handled as the banknotes after money exchange. If there is a shortage of the escrowed banknotes as the banknotes after money exchange, the banknotes after money exchange equivalent to the shortage are transported from the banknote storage unit 45 to the outlet 42.

In contrast, upon determining that the money dispensing from the banknote storage unit 45 is to be given higher priority (N at Step S100), the banknote processing system 1 transports the banknotes after money exchange from the banknote storage unit 45 to the outlet 42, and dispenses therefrom (Step S102). After that, the amount of money that is dispensed as the banknotes after money exchange is replenished from the escrow unit 43 to the banknote storage unit 45 (Step S103). The money exchange process ends after completion of Steps S99, S101, and S103. After that, the process control is returned to Step S91.

Thus, in the banknote processing system 1, as a mode of the deposit process or the dispensing process, any one mode between a mode where the deposited banknotes or the dispensing banknotes are escrowed in the escrow unit 43 (i.e., when the first processing mode is set) and a mode where the banknotes are not escrowed (i.e., when any one from among the second processing mode to the fifth processing mode is set) can be executed.

As in the first processing mode, in the escrow mode where escrowing of the deposited banknotes or the dispensing banknotes is performed, for example, in a state where the banknotes are escrowed, the user can be asked to approve/disapprove the deposit process or the dispensing process. Therefore, in case the user disapproves the deposit process, the banknotes that were actually deposited can be returned to the user from the escrow unit thereby realizing the process for cancellation of the deposit process. Consequently, compared to a case where the deposited banknotes are dispensed and returned after being stored in the banknote storage unit 45, the process can be performed promptly and correctly.

Moreover, in case the user disapproves the dispensing process, the escrowed banknotes are returned to the banknote storage unit 45 thereby realizing the process for cancellation of the dispensing process. Consequently, compared to a case where it is necessary to manually return the dispensed banknotes to the banknote storage unit 45 after once dispensing the banknotes from the outlet 42, the process for cancellation of the dispensing process can be simplified.

In contrast, as in each of the second processing mode to the fifth processing mode, in the non-escrow mode where escrowing banknotes of the deposited process or the dispensing process is not performed, by omitting the escrowing operation, the deposit/dispensing process can be executed promptly.

In the deposit/dispensing process, whether it is desirable to perform the escrowing operation depends on the use environment of the banknote processing system. In the banknote processing system 1 according to the present embodiment, because it can be determined as desired whether to perform the escrowing operation, the deposit process or the dispensing process appropriate for the usage environment and the like can be realized.

In the banknote processing system 1, even when the escrowing operation is not performed, the escrow unit 43 can be used effectively by setting any one of the second processing mode to the fifth processing mode.

Next, the advantages and the like achieved when each of the processing modes among the second processing mode to the fifth processing mode is set are explained below.

When the second processing mode is set, if the reject box 44 that stores therein the unfit banknotes becomes full, the transport destination of the unfit banknotes is automatically changed from the reject box 44 to the escrow unit 43 (Step S39). Consequently, the number of unfit banknotes that can be stored in the apparatus is increased as a matter of fact, so that a situation where the process has to be stopped due to a shortage of free space for storing the unfit banknotes can be avoided to the utmost.

When the third processing mode is set, if banknotes of the sub-currency are deposited, the value of those banknotes is added to the deposited amount after converting into the value of the main currency, and the banknotes of the sub-currency are transported to the escrow unit 43 (Step S57). Consequently, in the deposit process, while reflecting the value of the sub-currency to the deposited amount, the banknotes of the sub-currency can be separately stored from the banknotes of the main currency stored in the banknote storage unit 45 and the rejected banknotes stored in the reject box 44. By doing so, the separately stored deposited banknotes of the sub-currency can be managed separately from the banknotes of the main currency and the like.

When the fourth processing mode is set, the traceable banknotes are previously prepared, and the traceable banknotes are dispensed based on an instruction from the user. Consequently, when an invading robber asks for money, the user can dispense the traceable banknotes and handover them to the robber. Because, the serial numbers of the traceable banknotes are previously recorded, the recorded serial numbers can be used to search the culprit after the robbery has taken place.

When the fifth processing mode is set, the banknotes previously stored in the escrow unit 43 are used as the banknotes after money exchange. Consequently, by storing the banknotes of the denominations that are often specified as the banknotes after money exchange, a situation where the process has to be stopped due to a shortage of the banknotes after money exchange can be prevented to the utmost.

Meanwhile, a transportation distance from the escrow unit 43 up to the outlet 42 is shorter than that from the banknote storage unit 45 up to the outlet 42. Consequently, the chances of occurrence of a transportation jam can be suppressed to the utmost by dispensing the banknotes after money exchange from the escrow unit 43 in the money exchange process. Moreover, transportation of banknotes from the escrow unit 43 to the outlet 42 is realized only by the upper unit 15 and therefore, even when a transportation jam occurs, the user can recover the jam relatively easily.

It can be configured such that when the non-escrow mode has been set, the door 43*a* of the escrow unit 43 can be opened only by inputting an authentic password. It is also possible to automatically or manually record a log of opening/closing of the door 43*a* in the memory unit 204. By doing so, degradation of security level arising due to use of the memory unit 43 for various purposes can be prevented.

In the banknote processing system 1, the banknote depositing and dispensing apparatus 11 and the terminal devices (12 and 13) are shown as separate devices; however, the banknote depositing and dispensing apparatus 11 itself can take up the role (acquiring of information on user operations, display on the display unit, and the like) of the terminal devices (12 and 13) and the terminal devices (12 and 13) are not provided. Moreover, in the present embodiment, although banknotes have been taken as an example of money, coins can be used instead of the banknotes or in addition to the banknotes.

As explained above, the banknote processing system 1 (or the banknote depositing and dispensing apparatus 11) according to an embodiment of the present invention includes the inlet 41 where money can be introduced, the banknote storage unit 45 in which money is stored, the banknote transport unit 46 that transports deposited money from the inlet 41 toward the banknote storage unit 45 (transports dispensing money from the banknote storage unit 45 to the outlet 42), and the control unit 201 that controls the banknote transport unit 46 to perform a deposit process of transporting the deposited money to and storing the deposited money in the banknote storage unit 45. The control unit 201 also performs a control to transport the dispensing money to the outlet 42 and to dispense them.

The banknote processing system 1 further includes the escrow unit 43 that escrows banknotes, and the process-mode setting unit 203 that sets, based on an instruction from a user, a processing mode to be executed between the escrow mode (the first processing mode) and the non-escrow mode (the second processing mode to the fifth processing mode).

When performing the deposit process, the control unit 201, when the processing mode has been set to the escrow mode, first transports the deposited money from the inlet 41 to the escrow unit 43 and escrows therein, and then transports the money to the banknote storage unit 45 and stores therein. In contrast, when the processing mode has been set to the non-escrow mode, the control unit 201 transports the deposited money from the inlet 41 to the banknote storage unit 45 and stored therein without escrowing in the escrow unit 43.

When performing the dispensing process, the control unit 201, when the processing mode has been set to the escrow mode, first transports the dispensing money from the banknote storage unit 45 to the escrow unit 43 and escrows therein, and then transports the money to the outlet 42 and dispenses therefrom. In contrast, when the processing mode has been set to the non-escrow mode, the control unit 201 transports the dispensing money from the banknote storage unit 45 to the outlet 42 and dispenses therefrom without escrowing in the escrow unit 43.

In the banknote processing system 1, although any one among the four processing modes of the second processing mode to the fifth processing mode can be set as desired as the processing mode, the configuration is not limited to this. For example, it is possible to prepare only one processing mode among the second processing mode to the fifth processing mode as the non-escrow mode.

Industrial Applicability

The present invention can be used in a money processing device and the like that executes a deposit process and/or a dispensing process.

Explanations of Letters or Numerals

1 banknote processing system
11 banknote depositing and dispensing apparatus
12 terminal device
13 terminal device
14 housing
15 upper unit
16 lower unit
41 inlet
42 outlet
42 escrow unit
43*a* door
44 reject box
45 banknote storage unit
46 banknote transport unit
50 recognition unit
201 control unit
202 calculation unit
203 process-mode setting unit
204 memory unit
A, B, C, D, E, F, and G branching points

The invention claimed is:

1. A money processing device that processes money, comprising:

an inlet that receives deposited money;

an outlet for dispensing money;

a plurality of storage units that store money therein;

an escrow unit that escrows money;

a transport unit that can transport the deposited money from the inlet either directly to the storage units or to the storage units through the escrow unit, and can transport dispensing money either from a storage unit directly to the outlet or through the escrow unit to the outlet;

a recognition unit that recognizes fitness of money;

a mode setting unit that sets an operation to be performed in a deposit process to any of an escrow mode and a non-escrow mode; and a control unit that controls the transport unit based on settings set by the mode setting unit, wherein in the escrow mode, the control unit exerts control so as to transport the deposited money received in the inlet to the storage units and store therein after escrowing the deposited money in the escrow unit, and in the non-escrow mode, the control unit exerts control so as to directly transport the deposited money from the inlet to the storage units and store therein without escrowing the deposited money in the escrow unit wherein, in the non-escrow mode, the control unit exerts control so that unfit money recognized by the recognition unit is stored in the escrow unit.

2. The money processing device according to claim 1, further comprising:

a reject box that stores therein rejected money, wherein, the control unit transports the unfit money to the reject box or the escrow unit and stores therein.

3. The money processing device according to claim 2, wherein the control unit, when the unfit money is being stored in the escrow unit and there is a free space in the reject box, transports the unfit money from the escrow unit to the reject box and stores therein.

4. The money processing device according to claim 2, wherein the control unit, when the unfit money is being stored in the escrow unit and there is no free space in the reject box, inform of a fact that the unfit money is stored in the escrow unit.

5. A money processing device that processes money, comprising:

an inlet that receives deposited money;

a storage unit that stores money transported from the inlet;

an outlet that dispenses money transported from the storage unit;

an escrow unit that escrows money;

a transport unit that transports the money direct to a transport destination or transports the money to the transport destination after escrowing the money in the escrow unit;

a control unit that controls the transport unit based on a setting that has been previously set to an escrow mode or a non-escrow mode, wherein in the escrow mode the control unit exerts control so as to transport the money to the transport destination after escrowing the money in the escrow unit, in the non-escrow mode, the control unit exerts control so as to transport the money direct to the transport destination without escrowing the money in the escrow unit; and a reject box that stores therein rejected money; and wherein, in the non-escrow mode, the control unit exerts control so that the escrow unit is used for stacking the rejected money.

6. The money processing device according to claim 5, wherein the control unit, when the rejected money is being stored in the escrow unit and there is a free space in the reject box, transports the rejected money from the escrow unit to the reject box and stores therein.

7. The money processing device according to claim 5, wherein the control unit, when the rejected money is being stored in the escrow unit and there is no free space in the reject box, inform of a fact that the rejected money is stored in the escrow unit.

* * * * *